(12) United States Patent
Vermeulen

(10) Patent No.: US 11,691,733 B2
(45) Date of Patent: Jul. 4, 2023

(54) INFLATABLE ISOLATION WALLS FOR AIRCRAFT CABINS

(71) Applicant: Koninklijke Fabriek Inventum B.V., Nieuwegein (NL)

(72) Inventor: Timothy Vermeulen, Nieuwegein (NL)

(73) Assignee: B/E AEROSPAC, INC., Winston Salem, NC (US)

( * ) Notice: Subject to any disclaimer, the term of this patent is extended or adjusted under 35 U.S.C. 154(b) by 55 days.

(21) Appl. No.: 17/339,630

(22) Filed: Jun. 4, 2021

(65) Prior Publication Data
US 2021/0380253 A1 Dec. 9, 2021

Related U.S. Application Data

(60) Provisional application No. 63/034,796, filed on Jun. 4, 2020.

(51) Int. Cl.
*B64D 11/00* (2006.01)
*B64C 1/34* (2006.01)
*B64D 13/00* (2006.01)

(52) U.S. Cl.
CPC ............ *B64D 11/0023* (2013.01); *B64C 1/34* (2013.01); *B64D 13/00* (2013.01); *B64D 2013/003* (2013.01)

(58) Field of Classification Search
CPC ........ B60J 9/04; B64D 11/0023; B64D 13/00; B64D 2013/003; B64C 1/34
See application file for complete search history.

(56) References Cited

U.S. PATENT DOCUMENTS

| 3,548,904 A | 12/1970 | MacKell |
| 8,528,260 B2 | 9/2013 | Von Ballmoos et al. |
| 2015/0321744 A1* | 11/2015 | Vetter ........................ B64C 1/10 244/118.5 |
| 2022/0213683 A1* | 7/2022 | Weiqiang .............. E04B 2/7416 |

FOREIGN PATENT DOCUMENTS

| DE | 3922579 A1 * | 1/1991 |
| DE | 3922579 A1 | 1/1991 |
| EP | 3272643 A1 | 1/2018 |

OTHER PUBLICATIONS

European Search Report issued during prosecution of corresponding European Patent Application No. 21177875.8 dated Oct. 21, 2021. (13 pages).

* cited by examiner

*Primary Examiner* — Joshua J Michener
*Assistant Examiner* — Cindi M Curry
(74) *Attorney, Agent, or Firm* — Locke Lord LLP; Joshua L. Jones; Gabriella D'Angelo

(57) ABSTRACT

A partition for dividing a portion of an aircraft including at least a first inflatable cavity defined by a plurality of material sheets, and a nozzle configured to provide fluidic access to the first inflatable cavity, wherein the nozzle is configured to attach to an aircraft air vent.

21 Claims, 4 Drawing Sheets

INFLATABLE ISOLATION WALLS FOR AIRCRAFT CABINS

CROSS REFERENCE AND PRIORITY

This application claims priority to U.S. Provisional Application 63/034,796 filed on Jun. 4, 2020, the contents of which are wholly incorporated by reference.

BACKGROUND

Technological Field

The present disclosure relates generally to protection against pathogen spread on an aircraft, specifically to an inflatable isolation wall.

Description of Related Art

The COVID-19 pandemic showed us that pathogens can spread easily with the global travel. For that reason, it has become vital to minimize contamination and pathogen spread between passengers during flights. It is foreseeable that at some point happen that there may be a passenger or group of passengers on board an aircraft that is suspected of carrying COVID-19 or another virus. Right now, there are no ways to isolate a group of passengers effectively. There is a clear need in the art for isolating sick passengers from healthy ones. The present disclosure provides a solution for this need.

SUMMARY OF THE INVENTION

A partition for dividing a portion of an aircraft includes at least a first inflatable cavity defined by a plurality of material sheets, and a nozzle configured to provide fluidic access to the first inflatable cavity, wherein the nozzle is configured to attach to an aircraft air vent. The first inflatable cavity can include a plurality of interconnected cavities. At least a pair of cavities of the plurality of cavities can be temporarily coupled by a hook and loop coupling, a zipper, or by pins. The temporary coupler can extend partially from a first end of the inflatable cavity to the second end of the inflatable cavity A portion of the partition can include a rounded edge configured to adhere to a wall or an overhead bin of the cabin. The plurality of inflatable cavities can extend from a first wall to a second wall and from a floor wall to a ceiling.

Each cavity may include an air passage connected to an adjacent cavity. At least a pair of opposing cavities on opposite sides of the temporary coupler can include air nozzles to be coupled to an aircraft passenger vent. The partition can be used by removing the inflatable partition from a storage compartment, attaching the partition to an air vent within a row of an aircraft and driving cabin air to the partition in order to inflate the partition. The partition can include an inflated position, and a collapsed position such that a storage pack can be used for storing the partition in the collapsed configuration, wherein the partition can be stored within a storage unit of the aircraft.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
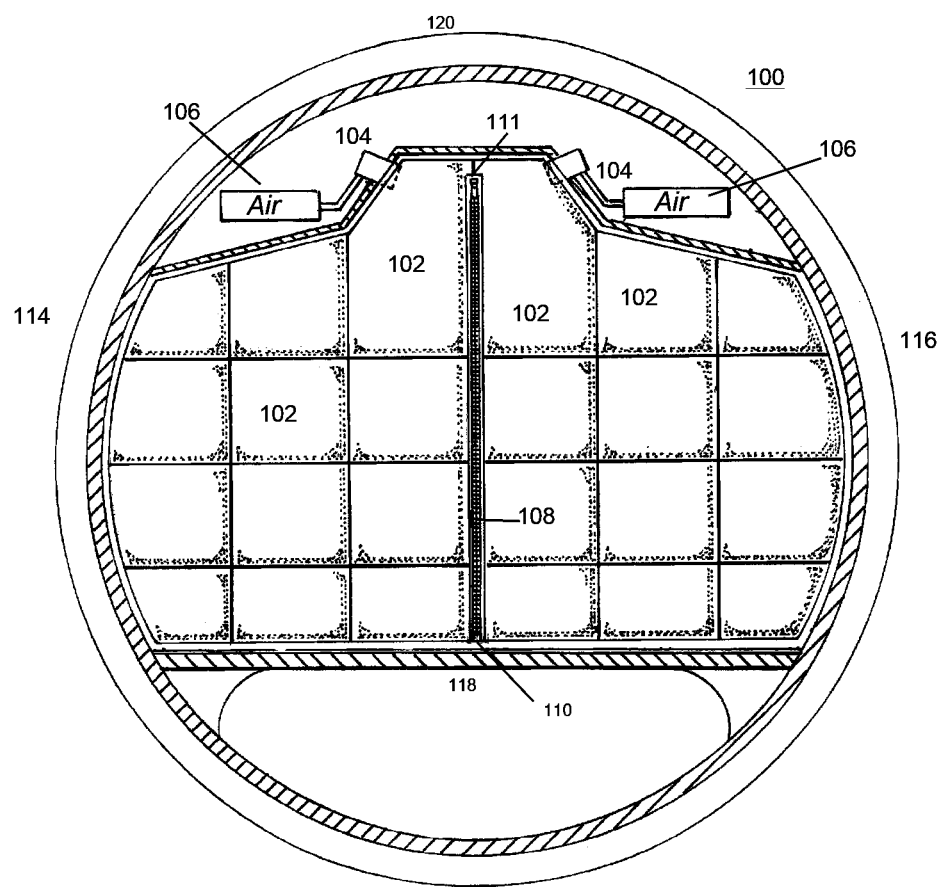
FIG. 1 is a cross-sectional view of an aircraft body showing an inflatable partition across the body.
Figure 2:
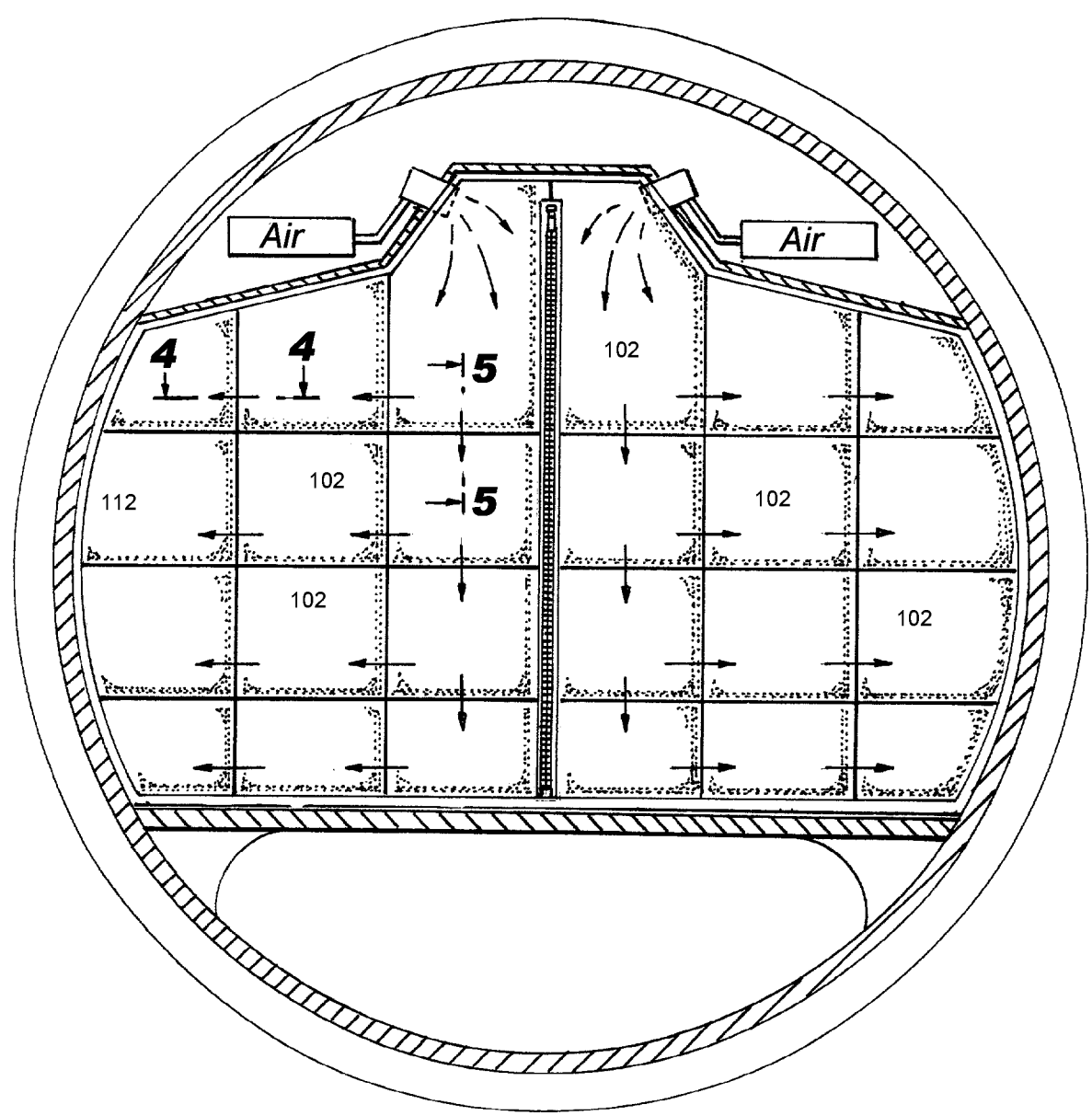
FIG. 2 a cross-sectional view of the aircraft body of FIG. 1 showing how air enters each of the partitions.
Figure 3:
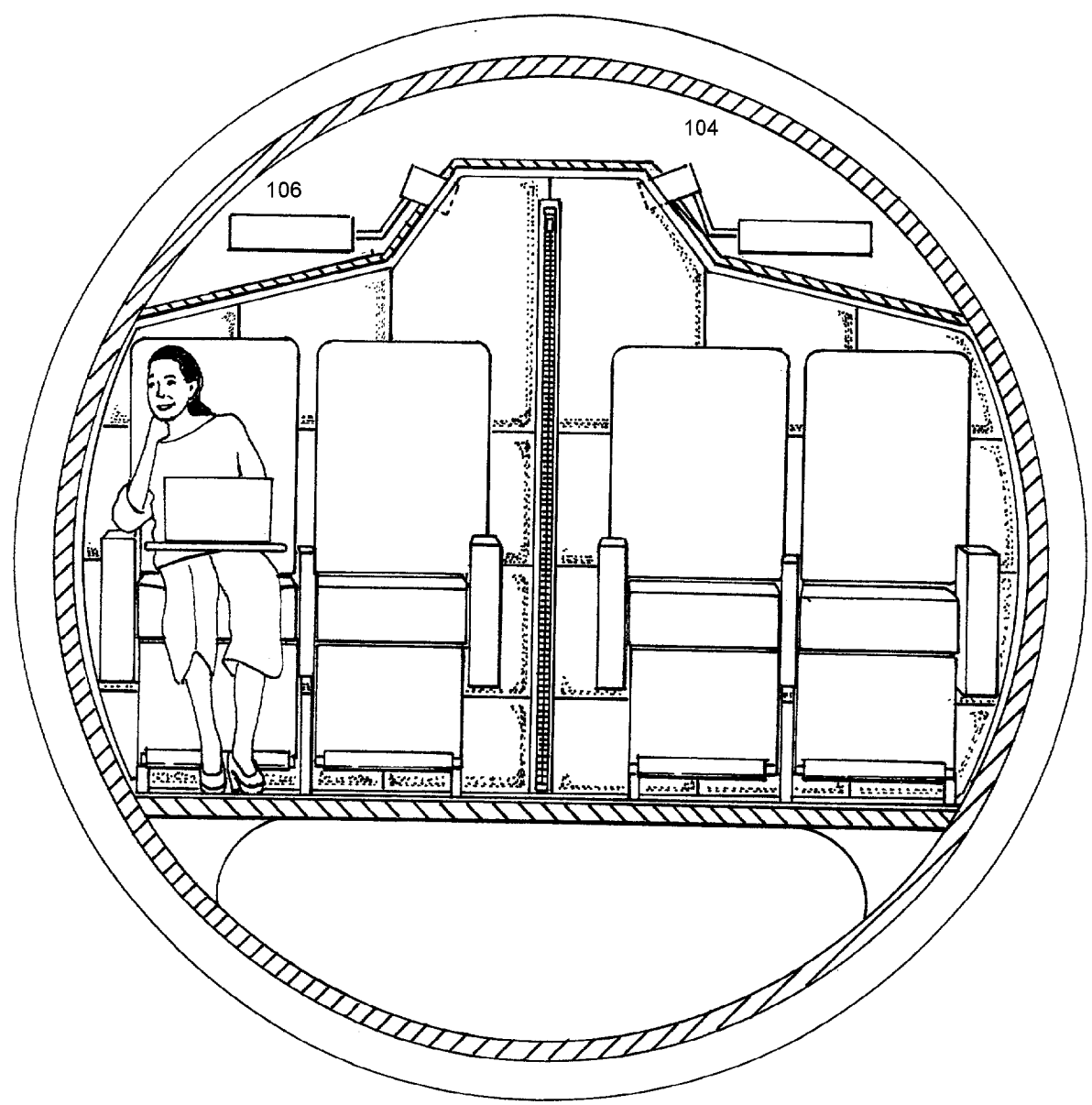
FIG. 3 is a cross-sectional view of the aircraft body showing an inflatable partition in situ.
Figure 4:
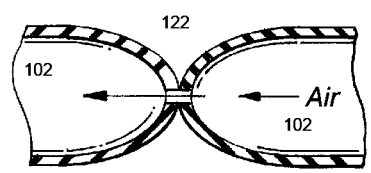
FIG. 4 is an enlarged view of air passing from one partition to an adjacent one.
Figure 5:
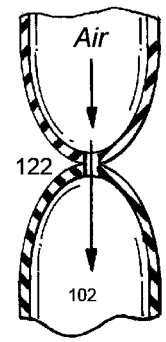
FIG. 5 is an enlarged view of air passing from one partition to an adjacent one.
Figure 6:
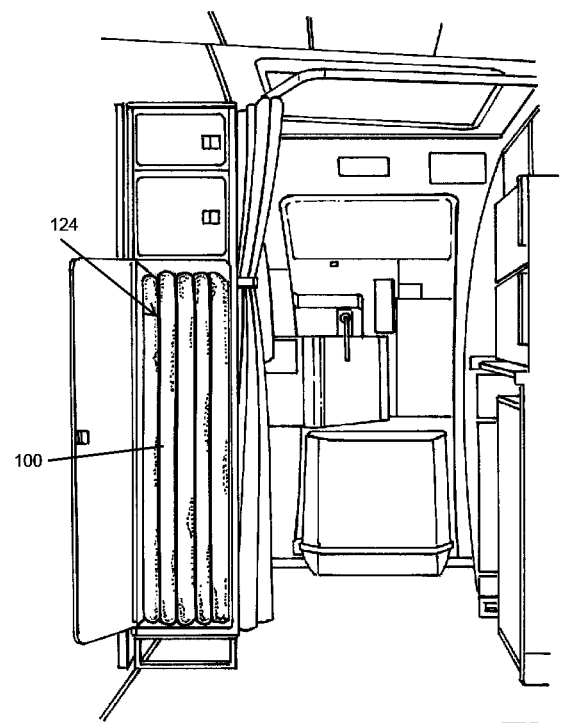
FIG. 6 is a view of a stored view of the partition of FIG. 1.

Reference will now be made to the drawings wherein like reference numerals identify similar structural features or aspects of the subject disclosure. For purposes of explanation and illustration, and not limitation, a partial view of an exemplary embodiment of an inflatable partition is shown in FIG. 1 and is designated generally by reference character 100. Other embodiments of the partition in accordance with the disclosure, or aspects thereof, are provided in FIGS. 2-6, as will be described. The partition can be used to isolate a sick passenger, group or passengers, or an entire section of the cabin from the rest of the passengers in flight while also keeping the potentially sick passengers comfortable in their seat.

Referring now to FIGS. 1-6, a partition 100 for cordoning of a portion aircraft, includes a plurality of cavities 102 stitched together using at least a front and a back sheet. The partition 100 includes a pair of nozzles 104 each within its own half of the partition which attaches to a passenger air vent 106. The partition 100 is partially split down the middle into two halves, where the halves are coupled to each other by a hook and loop coupling, a zipper, pins or any other acceptable coupling 108 that stops airflow through the partition split. The temporary coupler 108 extends partially from a first end 110 of the inflatable cavity to the second end 111 of the inflatable cavity not quite reaching the top.

The partition 100 includes rounded edges 112 that adhere to the walls and to the overhead bin of the cabin of the aircraft. The partition 100 at the center extends from a first wall 114 to a second wall 116 and from a floor 118 wall to a ceiling 120 of the aircraft.

Each cavity 102 includes an air passage 122 connected to an adjacent cavity in order to pass air from one to another starting with the cavity attached to the nozzle. The partition 100 can be used by removing 100 from a storage compartment 124, attaching the partition 100 to an air vent 106 located within a row between seats and driving cabin air to the partition by turning on the air vent and inflating the partition 100.

The systems of the present disclosure, as described above and shown in the drawings, provide for an improved inflatable partition that provides protection to passengers within an aircraft from pathogen spread while keeping the potentially ill passengers comfortable and visible to the crew. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system for dividing a portion of an aircraft cabin, comprising:
   an inflatable partition including;
      a plurality of cavities defined by a first sheet and a second sheet stitched together;
      a nozzle configured to attach to an aircraft air vent to provide fluidic access to the plurality of inflatable cavities; and
      a first partition half and a second partition half defined by a partition split, wherein the first partition half and the second partition half each include respective nozzles, wherein the partition is configured to extend from a first wall of the aircraft cabin to a second wall of the aircraft cabin, wherein the partition split is disposed at a center of the partition and a center of the aircraft cabin, wherein the first partition half is configured to extend from the first wall of the aircraft cabin to the center of the aircraft cabin and the second partition half is configured to extend from the second wall of the aircraft cabin to the center of the aircraft cabin, wherein the first partition half and the second partition half are connected by a coupling disposed at the partition split.

2. The system of claim 1, wherein the plurality of cavities are interconnected.

3. The system of claim 2, wherein each cavity of the plurality of cavities includes at least one air passage configured to connect to at least one adjacent cavity to allow air to pass from one cavity to the at least one adjacent cavity.

4. The system of claim of claim 1, wherein the coupling is configured to prevent airflow from passing from the plurality of cavities through the partition split.

5. The system of claim 1, wherein the coupling extends from a first end of the partition to a position substantially near a second end of the partition.

6. The system of claim 5, wherein the first end of the partition is configured to extend from a floor of the aircraft to a ceiling the aircraft cabin, wherein the first end of the partition is adjacent the floor of the aircraft cabin and the second end of the partition is adjacent the ceiling of the aircraft cabin.

7. The system of claim 1, wherein the coupling includes a temporary coupling.

8. The system of claim 7, wherein the temporary coupling includes a hook and loop coupling, a zipper, or one or more pins.

9. The system of claim 1, wherein the partition includes one or more rounded edges.

10. The system of claim 9, wherein the one or more rounded edges are configured to adhere to at least one of an overhead bin, a wall of the aircraft cabin, a ceiling of the aircraft cabin, and/or a floor of the aircraft cabin.

11. The system of claim 1, wherein the partition includes an inflated state and a deflated state.

12. The system of claim 11, wherein in the deflated state, the partition is configured to be stored in a storage compartment.

13. The system of claim 12, wherein the storage compartment includes a storage compartment of the aircraft cabin.

14. The system of claim 1, further comprising the aircraft air vent.

15. The system of claim 1, wherein the partition split is configured to allow passengers and/or crew to pass through it during flight.

16. The system of claim 1, wherein the partition is erected between passenger rows.

17. The system of claim 14, wherein the aircraft vent incudes a floor vent and/or an overhead vent.

18. A system for dividing a portion of an aircraft cabin, comprising:
   an inflatable partition including:
      a plurality of cavities defined by a first sheet and a second sheet stitched together; and
      a nozzle configured to attach to an aircraft air vent to provide fluidic access to the plurality of inflatable cavities, wherein the partition is partially split down the middle into two halves, wherein the two halves are coupled together by a coupling to allow access through the partition in an open position and to prevent passage of airflow through the partition split in a closed position.

19. A method of dividing an aircraft cabin, comprising:
   attaching an inflatable partition to an aircraft air vent, the inflatable partition including;
      a plurality of cavities defined by a first sheet and a second sheet stitched together;
      a nozzle configured to attach to an aircraft air vent to provide fluidic access to the plurality of inflatable cavities; and
      a first partition half and a second partition half defined by a partition split, wherein the first partition half and the second partition half each include respective nozzles, wherein the partition is configured to extend from a first wall of the aircraft cabin to a second wall of the aircraft cabin, wherein the partition split is disposed at a center of the partition and a center of the aircraft cabin, wherein the first partition half is configured to extend from the first wall of the aircraft cabin to the center of the aircraft cabin and the second partition half is configured to extend from the second wall of the aircraft cabin to the center of the aircraft cabin, wherein the first partition half and the second partition half are connected by a coupling disposed at the partition split; and
   inflating the inflatable partition with cabin air from the aircraft air vent to divide one or more passenger rows within the aircraft cabin.

20. The method of claim 19, further comprising, removing the inflatable partition from a storage compartment.

21. The method of claim 19, further comprising, attaching at least one edge of the inflatable partition to at least one of a wall of the aircraft cabin, a floor of the aircraft cabin, and/or a ceiling of the aircraft cabin.

* * * * *

UNITED STATES PATENT AND TRADEMARK OFFICE
CERTIFICATE OF CORRECTION

PATENT NO. : 11,691,733 B2
APPLICATION NO. : 17/339630
DATED : July 4, 2023
INVENTOR(S) : Timothy Vermeulen Page 1 of 1

It is certified that error appears in the above-identified patent and that said Letters Patent is hereby corrected as shown below:

On the Title Page

Item (73) Assignee, should be changed to B/E AEROSPACE, INC.

Signed and Sealed this
Sixth Day of August, 2024

Katherine Kelly Vidal
*Director of the United States Patent and Trademark Office*